PORTABLE AND STORABLE DOLL HOUSE OR DISPLAY

Original Filed Dec. 31, 1962

INVENTOR.
LOUIS BENDER.

BY Louis Altman

ATTORNEY.

United States Patent Office

Re. 26,642
Reissued Aug. 12, 1969

26,642
PORTABLE AND STORABLE DOLL HOUSE OR DISPLAY

Louis Bender, Scotch Plains, N.J., assignor of one-half to Leo Miller, Plainfield, N.J.

Original No. 3,182,420, dated May 11, 1965, Ser. No. 248,668, Dec. 31, 1962. Application for reissue June 29, 1966, Ser. No. 564,709
Int. Cl. A63h *3/52, 33/42;* B65d *5/50*
U.S. Cl. 46—12 7 Claims

Matter enclosed in heavy brackets [ ] appears in the original patent but forms no part of this reissue specification; matter printed in italics indicates the additions made by reissue.

*ABSTRACT OF THE DISCLOSURE*

*A carrying case of two box-like portions hinged together and having a molded plastic sheet secured to the inner face of each portion. The sheets are formed to define upstanding objects simulating the interior of a room, or other environment when the case is open, and when the case is closed the objects of one portion project into the other portion and side walls of one box-like portion lie within corresponding walls of the other portion.*

This invention relates to a portable and storable representation such as a child's doll house or a presentation display.

There are a number of situations where various portable and storable representations are useful. For example when traveling with children it is often a problem to keep them from becoming bored while en route or while staying in unfamiliar surroundings, after they have left behind the friends and toys they are accustomed to playing with. In particular a doll house, often a standard item in a child's collection of toys, is generally considered too bulky and inconvenient to carry along on trips. Moreover the numerous loose items of miniature furniture in a doll house take time to retrieve, arrange, and put away, and can easily be mislaid and lost by the child. It is therefore likely that many of the pieces taken on a trip would become separated from the doll house and thus would not return. Even as to those which could be located, finding them might become a source of annoyance. It would therefore be desirable to provide a doll house which is easily portable so that it can be taken along to amuse a child on trips. It would also be desirable to provide a doll house which, even at home, would be easy to put away and store. Such a doll house should be compact and able to fold into a rugged and easily carried form. It should also preferably have the miniature furniture permanently secured thereto and enclosed inside the doll house when the latter is folded into storing or carrying form. Yet it is also desirable that the furniture, although permanently emplaced, be movable to some extent so as to provide more interest; for example a chair could be rotatable to simulate a swivel chair.

It is therefore an object of the invention to provide a doll house having the features of compactness, portability, easy storability, ruggedness, and permanent attachment of furniture with a certain amount of movement permitted.

Briefly, the invention is carried out by providing a rugged, convenient-sized closable carrying case adapted for easy portability and storability, and placing miniature furnishings therein. The carrying case, when open, represents a room in which the furnishings, such as furniture and the like, are placed and preferably permanently attached. When closed, the carrying case forms a compact and rugged enclosure for the furniture which makes storing and transportation easy and prevents loss of any loose contents.

An additional object of the invention is to provide a doll house which is inexpensive to manufacture. This may be achieved by molding the furniture and other furnishings from a unitary sheet of plastic, and cementing this sheet to an inside surface of the carrying case, thus also achieving the object of permanent, loss-proof emplacement.

Figure 1:
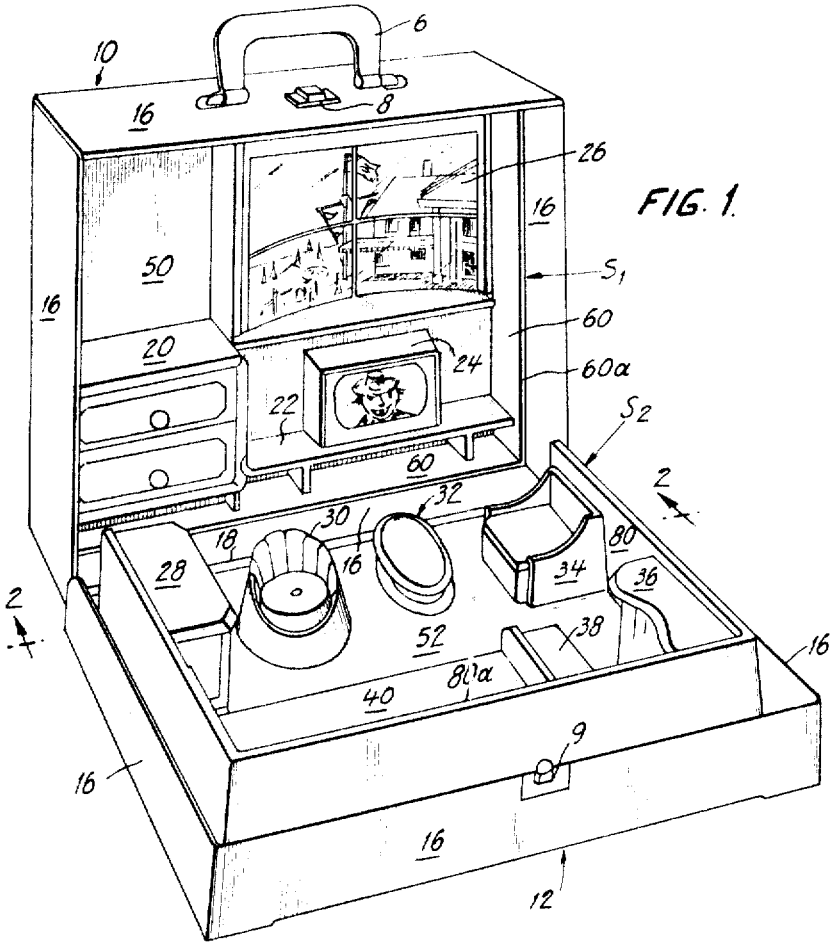
Figure 2:
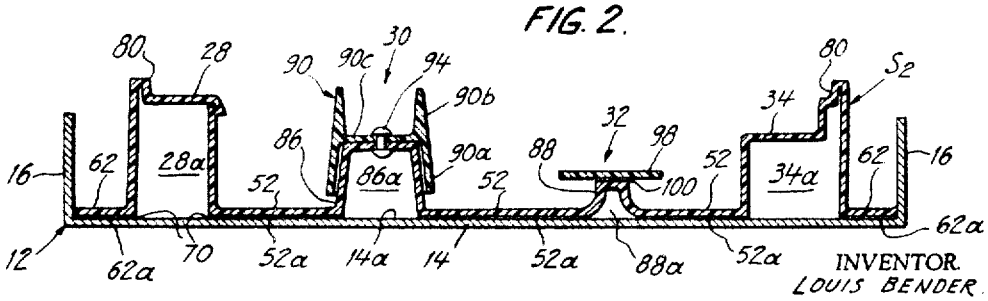

A more detailed explanation of the invention follows, making reference to the accompanying drawings, in which:

FIG. 1 is a perspective view of a portable doll house in accordance with this invention, with the carrying case opened to set up the doll house for play;

And FIG. 2 is a sectional view of the doll house of FIG. 1, taken along the lines 2—2 thereof, revealing details of the construction.

FIG. 1 shows an openable and closable carrying case in which the doll house is contained, the case being opened to reveal a typical arrangement of the furniture therein. The case, which has the usual carrying handle 6 and cooperating clasp members 8 and 9, includes two hinged-together upper and lower halves 10 and 12. Each of these includes a main side wall (e.g. the side wall 14, FIG. 2, of the lower half 12) and rim walls 16 at the edges of the main side walls. The lower half 12 is hinged to one of the rim walls 16 of the upper half 10 along the flexure line 18. Inside the case, secured to and projecting from the interior surfaces of the main side walls, are three-dimensional shapes simulating furnishings of a typical living room. In the specific arrangement shown these furnishings include a chest of drawers 20, a bench 22 on which is placed a television receiver 24, and a window 26 against the main side wall of the upper half 10. On the main side wall of the lower half 12 are a cabinet 28, a swivel chair 30, a coffee table 32, a love seat 34, a dresser 36, an end table 38, and a couch 40. The window 26 and television set 24 are provided with pictures, either drawings or photographs, representing what might actually be seen through the window or on the screen. Thus, in the open position as illustrated, the interior of the case represents a room. The upper half 10 of the case stands upright on one of its rim walls 16, so that the main side wall thereof rises vertically to establish a plane against which the wall of the room is represented. The lower half 12 of the case lies flat, so that the main side wall thereof is horizontal to establish a plane on which the floor of the room is represented.

The actual wall-representing surface 50, the floor-representing surface 52, and the various furnishings 20–40 are best molded from single sheets of plastic $S_1$ and $S_2$. A preferred material for these sheets is polystyrene, which is easily formed to the required shapes. Good results have been achieved in molding these sheets by the vacuum-forming process. The polystyrene sheets, which are relatively rigid at ordinary temperatures, are heated to a moldable consistency and then place over vacuum molds which have the required shapes formed therein. For example, one mold would have all the 3-dimensional shapes 20–26 formed therein for molding these shapes in the sheet $S_1$, and another mold would be similarly adapted for forming all the shapes 28–40 in the sheet $S_2$. Suction is then applied to draw the hot, pliable plastic sheets againt the molds. They are thus formed to the desired shapes and subsequently retain these shapes upon cooling.

The carrying case closes in such a manner that the rim walls 16 of the upper half 10 fit inwardly of the rim wall 16 of the lower half 12. Therefore there are certain differences in the way the sheets $S_1$ and $S_2$ are formed. The main portion of the upper sheet $S_1$ extends out to the rim walls 16 of the upper half 10, and its edges are turned perpendicularly to form a set of lips 60 encompassing the entire vertical wall-representation. The edges of the lower sheet $S_2$, on the other hand, extend horizontally to form flanges 62 (FIG. 2) encompassing three sides of the horizontal floor-representation and spacing that representation from the rim walls 16 of the carrying case lower half 12. The space thus provided immediately above the flanges 62 forms a channel to receive the upper rim walls 16 when the carrying case is closed.

As seen in the sectional view of FIG. 2, the plastic sheets (sheet $S_2$ being used as an example) are molded in such manner that the furniture-simulating shapes such as the cabinet 28 and love seat 34 project from the outer surface thereof, leaving corresponding concavities such as 28a and 34a opposite them on the inner face. This method of molding uses considerably less material and is therefore more economical than molding the desired shapes in a solid block. Between the furniture-simulating shapes are flat locations 52 which represent the floor of the room as it appears between items of furniture. The opposite flat locations 52a on the inner face of the plastic sheet, together with the flat locations 62a on the inner face opposite the flanges 62, provide a flat base along which the plastic sheet $S_2$ is secured to the interior face 14a of the lower half side wall 14, preferably by the use of a cement 70. The upper half assembly (FIG. 1) is similar, with the object-representing projections 20–26 being molded in the outer face of the plastic sheet $S_1$ in a manner to leave corresponding concavities on the inner face thereof. Between these molded projections are flat locations 50 on the outer face of the sheet $S_1$ representing the wall of the room, and opposite these are corresponding flat locations on the inner face which act as a base along which the sheet is secured, e.g. cemented, to the interior face of the side wall of the upper carrying case half 10. Further, the outside faces of the lips 60 of the upper sheet $S_1$ abut against the interior faces of the upper half rim walls 16 and are likewise cemented thereto to contribute to the solidity of the assembly.

Returning to FIG. 2, there are certain other features of construction which should be noted. Near the margins of the floor-representing sheet $S_1$, for example, between the various furniture-simulating shapes and the flange 62, is a representation 80 of the walls of the room (other than the wall 50 which is represented by the sheet $S_1$). This representation is a partial one in that it includes only so much of the wall up to a certain height and no more. In designing this display the upper edge 80a of the partial wall representation 80 and the outer edge 60a of the lips 60 may mark the farthest extent of the lower and upper sheets $S_2$ and $S_1$ respectively. Then these edges 80a and 60a may be designed to meet when the carrying case 10, 12 is closed, thus assuring that the various upper and lower object-simulating projections 20–26 and 28–40 respectively do not impinge on each other. Alternatively, some of the projections 20–40 may project beyond each other if they are laterally offset in such a way as to occupy different shapes when the carrying case is closed. In either event, the height of any one projection must be related to the interior thickness of the carrying case in such a way that the contents of the closed case are accommodated therein.

Special techniques may be used to form the swivel chair 30 and coffee table 32. The plastic sheet $S_2$ is formed with a pair of flat-topped bosses 86 and 88, leaving corresponding concavities 86a and 88a on the opposite side. These bosses 86 and 88 form pedestals for the swivel chair 30 and coffee table 32 respectively. The seat member 90 of the chair 30 is formed from a separate body of material, again preferably vacuum-formed polystyrene. The member 90 includes a generally cylindrical sleeve the lower part of which forms a depending skirt 90a, and the upper part 90b of which projects to a suitable height at the rear and sides of the chair 32 to form the backrest and arms thereof. A central transverse web 90c in the interior of the sleeve forms the seat cushion portion. The entire member 90 is supported on the boss 86, with the seat cushion portion 90c resting on the flat top of the boss, and being rotatably secured thereto by a pivot pin 94, which may be a rivet or similar fastener. This construction permits the chair-simulating member 90 to rotate about its pedestal boss 86 in the manner of a swivel chair. This lends a certain amount of movement to the furniture display and thus generates increased interest for children. The depending skirt 90a encircles the pedestal boss 86 and extends down almost, but not quite, to "floor" level. Thus it partially hides the boss 86, and consequently on a casual inspection the depending skirt 90a itself appears to be the base of the chair. This invests the doll house with a certain further interest in the mind of the child who wonders how the chair is thus rotatably supported. As for the coffee table 32, this may be formed by securing to the flat top of the pedestal boss 88 a separate flat sheet 98 (this too may be polystyrene) which forms the table top. Again, cement 100 represents a preferred method of fastening. In this way a relatively great width of the table top 98 in comparison to its narrow pedestal 88 is achieved without introducing any particular difficulties into the molding process. By the use of a pedestal boss plus a separate member as described, fairly difficult shapes may be formed with ease and at little expense, and a rotatable action and other additional interest may be provided.

Based on the specific example of the drawings, it will be appreciated that a great variety of doll house arrangements may be provided within the scope of this invention. As an example, among the objects simulated by a shape molded into the plastic sheets $S_1$ may be a picture hung on the wall, and this may be provided with an actual picture of some kind as in the case of the window 26 and television set 24. Furthermore, the concept has wider application than the specific doll house example used for illustration. The represented scene need not be indoors. The molded shapes may represent outdoor furniture in a garden or patio setting, with the vertical wall 50 representing an adjacent exterior wall of a building, e.g. the back of a house. Or a natural scene devoid of buildings may be represented by the molded shapes, including such natural objects as bushes, trees, rocks, animals, terrain features, etc. The vertical wall of the carrying case upper half, instead of representing an adjacent vertical wall, might then be entirely occupied by a picture of a scene stretching away into the distance. Thus the picture would provide a backdrop acting as a continuation of the represented scene. Such displays might also be quite useful outside the realm of children's toys. They might be used, for example, as portable presentations by landscape architects. Indoor representations might similarly have utility as interior decorator presentation models, or as model stage settings, each conveniently portable and storable in its own case. It will also be appreciated that the method of construction and emplacement of furnishings which is disclosed herein is applicable as well to an otherwise conventional doll house of the type which is not constructed within a carrying case.

[What has been described is a preferred embodiment and is believed to be the best mode of practicing the invention, but it will be clear to those skilled in the art that modifications may be made therein without departing from the principles of the invention. Accordingly this description is intended just as an example, the scope of the invention being stated in the appended claim.]

What is claimed is:

*1.* A portable representation comprising:

an openable and closeable carrying case;

said case including a first half and a second half, each of said case halves having a side wall and rim walls projecting therefrom;

the side wall of said first half establishing a plane on which to represent the floor of a room;

a unitary sheet of moldable material having a plurality of spaced-apart three-dimensional shapes integrally molded therein and projecting from one face thereof;

the opposite face of said sheet being formed with substantially flat areas;

said shapes simulating the shapes, on a reduced scale, of articles of a human environment including at least part of the walls of said room, and articles of furniture situated on said floor between said walls;

said sheet being further formed with a substantially flat flange at the margin thereof outside said wall-representing projection;

said opposite face of said sheet abutting and being fastened to the interior surface of said side wall of said first carrying case half at said flat areas and at said flange;

said carrying case halves being adapted to close with each other in such manner that said rim walls of said seecond half are disposed over said flange and fit between said rim walls of said first half and said wall-representing projection;

said carrying case having sufficient interior room to accommodate said article-simulating shapes.

*2. A portable representation comprising:*

*an openable and closeable case comprising two hinged portions, and*

*a unitary sheet secured to an interior face of one of said portions of said case, said sheet having integrally formed therewith upstanding objects simulating a scene found in a selected human environment and extending into the other portion of said case when said case is closed,*

*said case portions having sufficient interior room to jointly accommodate said scene-simulating objects when closed, thereby serving to protect said objects when not in use and as a carrying means therefor.*

*3. The portable representation of claim 2 wherein a second unitary sheet is secured to another interior portion of said case and is provided with a plurality of objects formed integral therewith, said objects being adapted to simulate a continuation of said scene simulated by first mentioned objects when said case is opened.*

*4. A portable representation, comprising:*

*an openable and closeable carrying case having two movably connected sections,*

*a first unitary sheet secured to the interior of one of said case sections,*

*a second unitary sheet secured to the interior of the other of said case sections,*

*each of said sheets having integrally formed therewith a plurality of objects simulating a scene found in a selected human environment,*

*said case having sufficient interior room to accommodate said scene-simulating objects without interference when closed to serve as a storage and carrying means therefor.*

*5. The portable representatios of claim 4 wherein said case sections are hingedly connected and are adapted to be opened to a position wherein they are disposed in substantially perpendicular relation and said first and second sheets form a substantially continuous representation of said scene.*

*6. The portable representation of claim 5 wherein the objects of said first second sheets simulate furnishings on and adjacent to the wall and floor of a room.*

*7. The portable representation of claim 4 wherein each of said sheets has said objects formed on one side thereof and has a plurality of substantially flat areas on the other side thereof, said flat areas being adhesively secured to the adjacent case section.*

References Cited

The following references, cited by the Examiner, are of record in the patented file of this patent or the original patent.

UNITED STATES PATENTS

| | | | |
|---|---|---|---|
| 243,873 | 7/1881 | Dorn et al. | 46—11 |
| 2,127,047 | 8/1938 | Pinney | 46—14 X |
| 2,716,335 | 8/1955 | Gallowhur | 46—12 X |
| 2,872,753 | 2/1959 | Fenton | 46—12 |
| 3,116,954 | 1/1964 | Orenstein | 46—14 X |

FOREIGN PATENTS

| | | |
|---|---|---|
| 8,581 | 1903 | Great Britain. |
| 263,312 | 11/1949 | Switzerland. |
| 1,012,556 | 4/1952 | France. |
| 1,218,468 | 12/1959 | France. |

LOUIS G. MANCENE, Primary Examiner

C. R. WENTZEL, Assistant Examiner

U.S. Cl. X.R.

46—15; 206—45